US009300539B2

(12) United States Patent
DeJana et al.

(10) Patent No.: US 9,300,539 B2
(45) Date of Patent: Mar. 29, 2016

(54) NETWORK COMPUTING MANAGEMENT (75) Inventors: Ryan G. DeJana, Longmont, CO (US); Lisa Seacat DeLuca, San Francisco, CA (US); Soobaek Jang, Hamden, CT (US); Daniel C. Krook, Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 453 days.

(21) Appl. No.: 13/197,945

(22) Filed: Aug. 4, 2011

(65) Prior Publication Data
US 2013/0036217 A1 Feb. 7, 2013

(51) Int. Cl.
*H04L 12/24* (2006.01)
*G06F 9/50* (2006.01)

(52) U.S. Cl.
CPC .............. *H04L 41/12* (2013.01); *G06F 9/5072* (2013.01); *G06F 2209/502* (2013.01)

(58) Field of Classification Search
None
See application file for complete search history.

(56) References Cited

U.S. PATENT DOCUMENTS

| 6,320,602 | B1 | 11/2001 | Burkhardt et al. |
| 7,853,953 | B2 * | 12/2010 | Devarakonda et al. ........ 718/105 |
| 8,023,966 | B2 * | 9/2011 | Aaltonen .................... 455/456.3 |
| 8,099,313 | B2 * | 1/2012 | Messer et al. ................. 705/7.21 |
| 8,271,655 | B2 * | 9/2012 | Dawson et al. ................ 709/226 |
| 8,316,125 | B2 * | 11/2012 | DeHaan ......................... 709/224 |
| 8,370,490 | B2 * | 2/2013 | Deng et al. .................... 709/225 |
| 8,417,938 | B1 * | 4/2013 | Considine et al. ............. 713/151 |
| 8,418,181 | B1 * | 4/2013 | Sirota et al. ................... 718/102 |
| 8,428,620 | B2 * | 4/2013 | Sweeney et al. ............ 455/456.3 |
| 8,527,633 | B2 * | 9/2013 | Bade et al. .................... 709/225 |
| 8,639,791 | B2 * | 1/2014 | Carter et al. .................. 709/223 |
| 2002/0077744 | A1 * | 6/2002 | Nakamura ..................... 701/202 |
| 2007/0233698 | A1 | 10/2007 | Sundar et al. |
| 2009/0029692 | A1 * | 1/2009 | Radermacher et al. ........ 455/418 |
| 2010/0088150 | A1 * | 4/2010 | Mazhar et al. .................. 705/10 |
| 2010/0169477 | A1 | 7/2010 | Stienhans et al. |
| 2010/0169497 | A1 | 7/2010 | Klimentiev et al. |
| 2010/0299366 | A1 | 11/2010 | Stienhans et al. |
| 2010/0312891 | A1 * | 12/2010 | Pairault et al. ................ 709/226 |
| 2010/0318658 | A1 * | 12/2010 | Zorn et al. .................... 709/226 |
| 2011/0029981 | A1 * | 2/2011 | Jaisinghani .................. 718/104 |
| 2011/0153824 | A1 * | 6/2011 | Chikando et al. ............. 709/226 |
| 2011/0276951 | A1 * | 11/2011 | Jain .............................. 717/140 |
| 2011/0282975 | A1 * | 11/2011 | Carter .......................... 709/220 |

(Continued)

OTHER PUBLICATIONS

Mell, et al. "The NIST Definition of Cloud Computing (Draft): Recommendations of the National Institute of Standards and Technology," National Institute of Standards and Technology, U.S. Department of Commerce, Jan. 2011, 7 pp.

*Primary Examiner* — Greg C Bengzon
(74) *Attorney, Agent, or Firm* — Cantor Colburn LLP (57) ABSTRACT

Network computing management is implemented by determining a location of a requestor requesting access to an instance configured at a data center, retrieving a list of data centers configured for a network computing environment, and evaluating aspects of the data centers in the list in view of the location of the requestor. The network computing management is further implemented by selecting a data center from the list that satisfies a threshold level of criteria and which threshold level exceeds a level ascertained for remaining data centers in the list. In response to determining the data center selected is different from the data center through which the instance is configured, the network computing management relocates the instance to the selected data center.

23 Claims, 6 Drawing Sheets

(56) References Cited

U.S. PATENT DOCUMENTS

| | | | |
|---|---|---|---|
| 2011/0289198 A1* | 11/2011 | Isaacson et al. | 709/221 |
| 2012/0096525 A1* | 4/2012 | Bolgert et al. | 726/6 |
| 2012/0102219 A1* | 4/2012 | Speckbacher et al. | 709/238 |
| 2012/0109705 A1* | 5/2012 | Belady et al. | 705/7.22 |
| 2012/0131193 A1* | 5/2012 | Ferris et al. | 709/226 |
| 2012/0131594 A1* | 5/2012 | Morgan | 718/105 |
| 2012/0179824 A1* | 7/2012 | Jackson | 709/226 |
| 2012/0227085 A1* | 9/2012 | Battersby et al. | 726/3 |
| 2012/0233625 A1* | 9/2012 | Sabin et al. | 718/105 |
| 2012/0239792 A1* | 9/2012 | Banerjee et al. | 709/223 |
| 2012/0297071 A1* | 11/2012 | Dawson et al. | 709/226 |
| 2012/0310765 A1* | 12/2012 | Masters | 705/26.3 |
| 2012/0311156 A1* | 12/2012 | DeJana et al. | 709/226 |
| 2012/0311575 A1* | 12/2012 | Song | 718/1 |
| 2012/0324259 A1* | 12/2012 | Aasheim et al. | 713/320 |
| 2013/0095880 A1* | 4/2013 | Tzamaloukas | 455/525 |
| 2014/0351606 A1* | 11/2014 | Demilo et al. | 713/193 |

\* cited by examiner

| DATA CENTER ID ⌐602 | DATA CENTER LOCATION ⌐604 | LANGUAGE ⌐606 | ENCRYPTION STRENGTH ⌐608 | CPU SPEED ⌐610 | CAPACITY/LOAD ⌐612 |
|---|---|---|---|---|---|
| XX-XXXX-XX | WEST COAST - US | ENGLISH/ SPANISH | 64 BIT | 1 GHz | XXXXXX |
| XX-XXXX-XX | EAST COAST - US | ENGLISH | 128 BIT | 2 GHz | XXXXXX |
| ... | ... | ... | ... | ... | ... |

600

FIG. 6

NETWORK COMPUTING MANAGEMENT

BACKGROUND

The present invention relates to networking computing, and more specifically, to network computing management through movable instances based on a user's current or future location.

Network-managed data by service providers has become increasingly popular, as the amount of data utilized by business enterprises and organizations has increased. The costs associated with hardware and storage devices, as well as their associated bandwidth requirements have made network-managed solutions more desirable.

In a cloud self-service provisioning process, an instance requester can select a resource such as a server or desktop image from an image catalog and provision an instance from it in a given data center. Once created, this instance stays in the current data center even though the user of the instance may change geographic locations. While the requester may have chosen the data center location based on his/her original location, changes in the user's geography may make that location unusable (e.g., due to network performance issues, government-imposed restrictions, and/or capabilities of a data center in the location, to name a few). For example, suppose a user is using an instance running in a data center in the United States to provide a demonstration. If the demonstration is presented in the United States, the resources running the instance may be acceptable in terms of network performance. However, if the user then relocates to Asia to present the demonstration, the quality or reliability of the transmission may be degraded. While a user could create separate instances in each data center, this solution could result in potential licensing issues and/or additional configuration work and associated costs.

What is needed is a way to move, or relocate, instances from one location to another based on the current or future location of the user.

SUMMARY

According to one embodiment of the present invention, a method for network computing management is provided. The method includes determining a location of a requestor requesting access to an instance configured at a data center, retrieving a list of data centers configured for a network computing environment, evaluating aspects of the data centers in the list in view of the location of the requestor, and selecting a data center from the list that satisfies a threshold level of criteria and which threshold level exceeds a level ascertained for remaining data centers in the list. In response to determining the data center selected is different from the data center through which the instance is configured, relocating the instance to the selected data center.

According to another embodiment of the present invention, a system for network computing management is provided. The system includes a computer processor and logic executable by the computer processor. The logic is configured to implement a method. The method includes determining a location of a requestor device requesting access to an instance configured at a data center, retrieving a list of data centers configured for a network computing environment, evaluating aspects of the data centers in the list in view of the location of the requestor, and selecting a data center from the list that satisfies a threshold level of criteria and which threshold level exceeds a level ascertained for remaining data centers in the list. In response to determining the data center selected is different from the data center through which the instance is configured, relocating the instance to the selected data center.

According to a further embodiment of the present invention, a computer program product for network computing management is provided. The computer program product includes a storage medium having computer-readable program code embodied thereon, which when executed by a computer processor, causes the computer processor to implement a method. The method includes determining a location of a requestor requesting access to an instance configured at a data center, retrieving a list of data centers configured for a network computing environment, evaluating aspects of the data centers in the list in view of the location of the requestor, and selecting a data center from the list that satisfies a threshold level of criteria and which threshold level exceeds a level ascertained for remaining data centers in the list. In response to determining the data center selected is different from the data center through which the instance is configured, relocating the instance to the selected data center.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to network computing management, which provide the ability to move or relocate configuration instances from one data center to another based on the current or future location of a user. An instance, as described herein, refers to a virtual machine with specified memory, storage space, and virtual processing cores and units that are defined for a particular platform, such as 32- or 64-bit platform. In one exemplary embodiment, the network environment operates via a cloud infrastructure in which the storage of, and access to, data storage is managed by a service provider on behalf of the data owner and/or end user.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed (e.g., any client-server model).

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
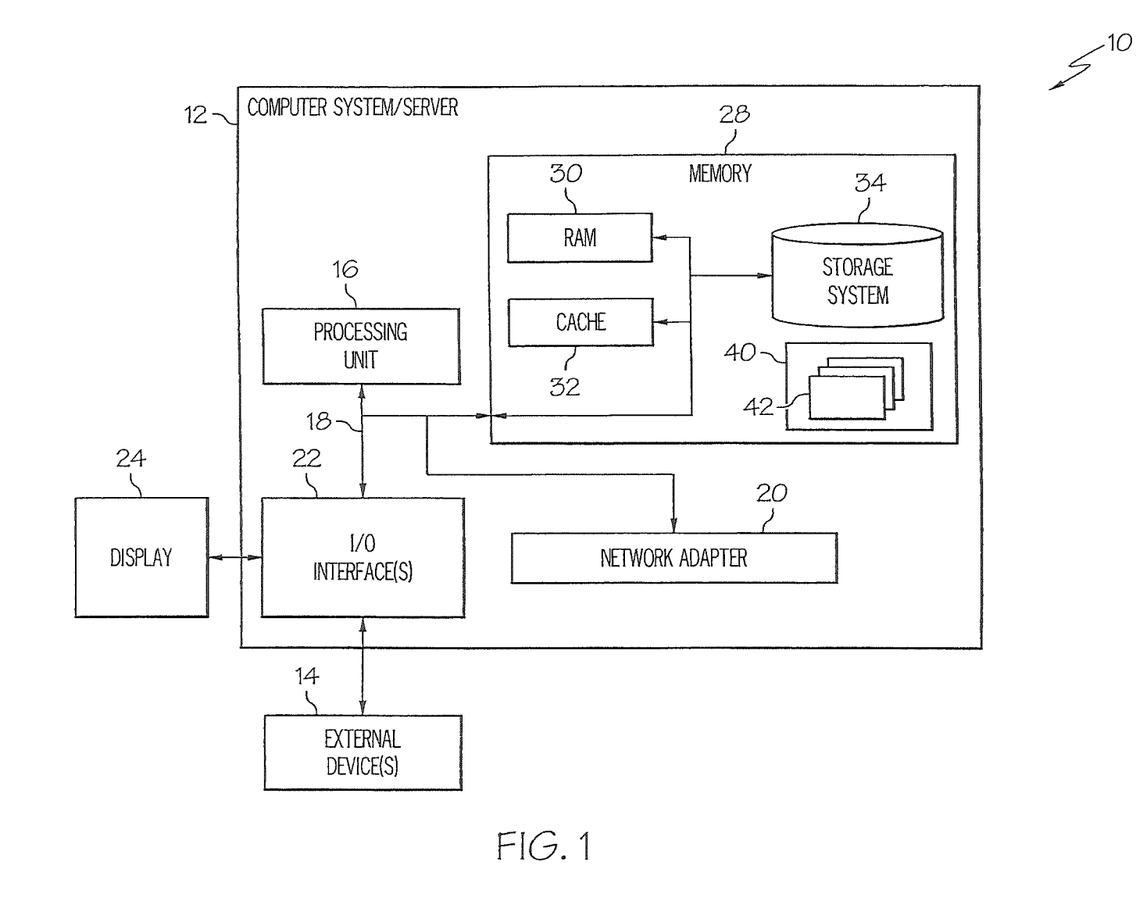
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
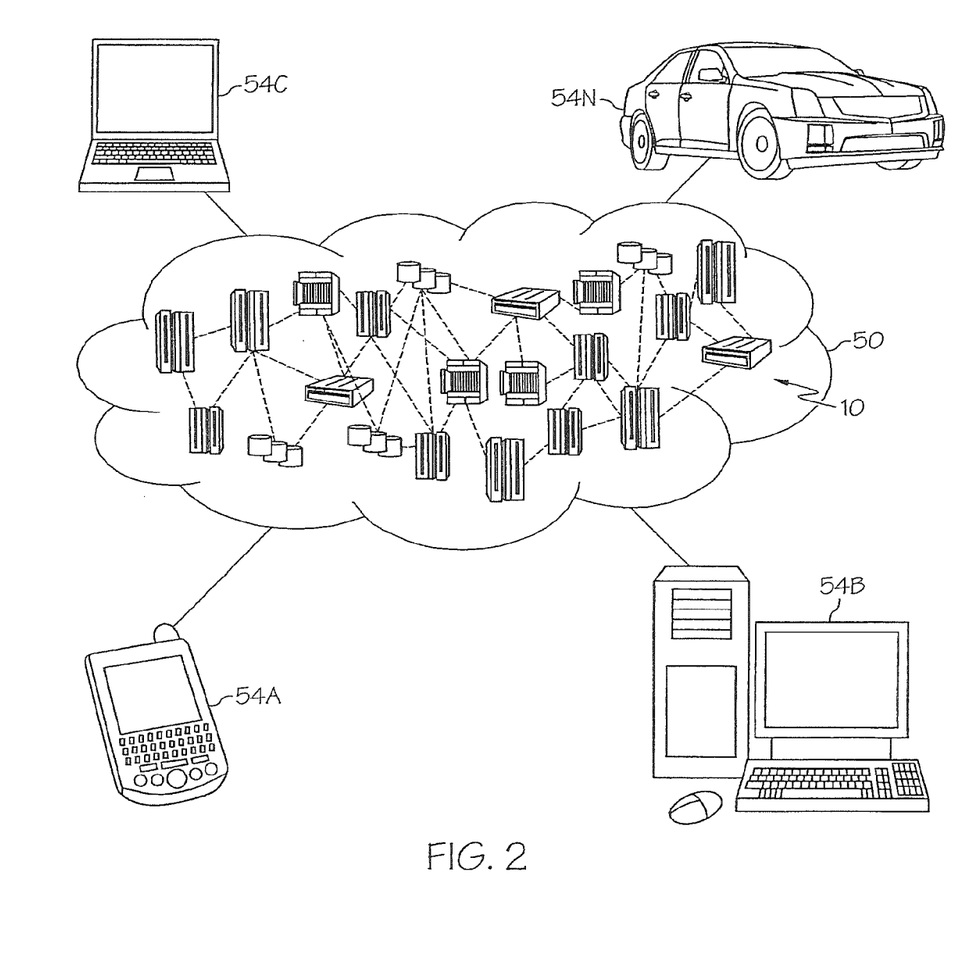
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
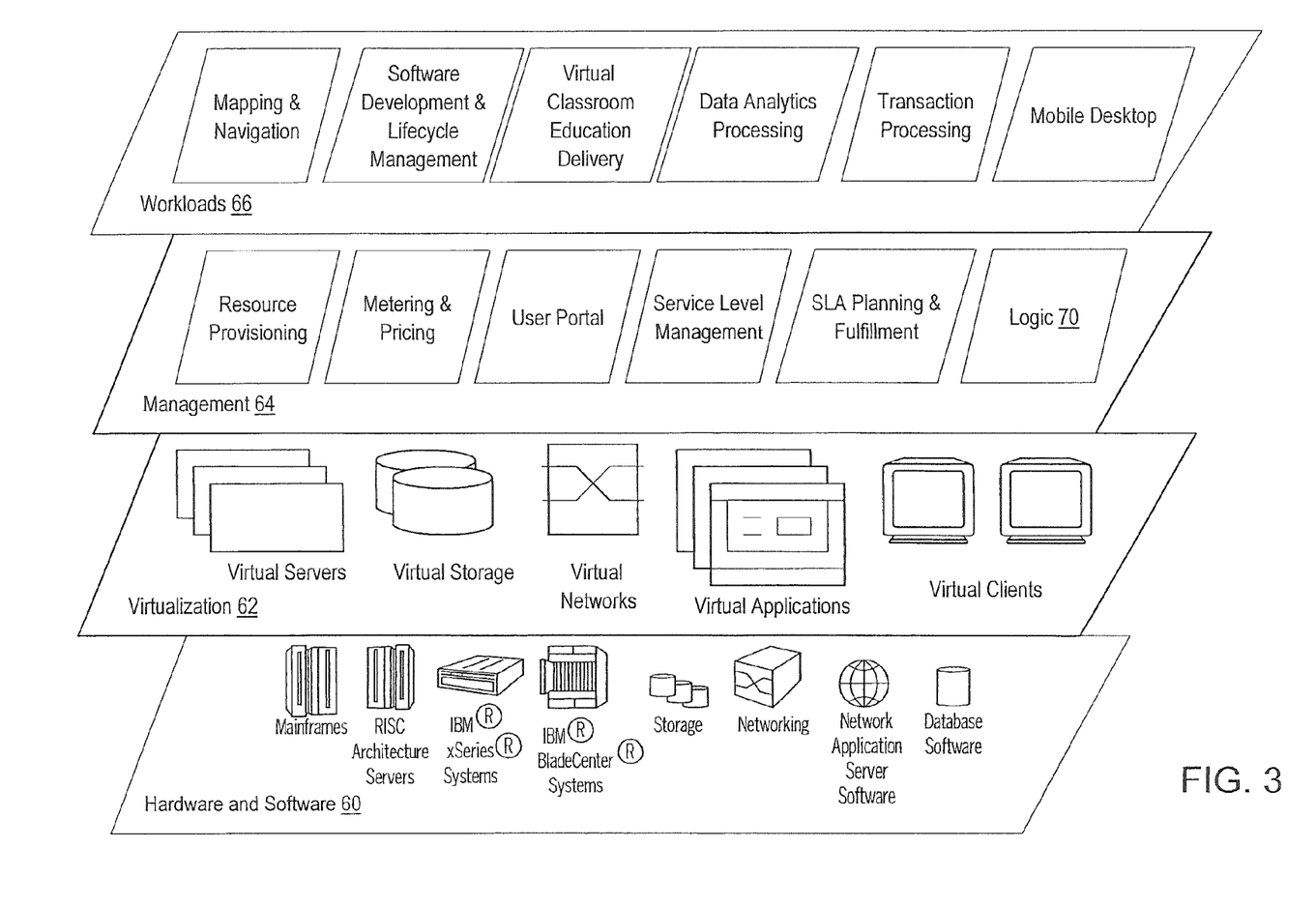
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one embodiment, one or both of the hardware and software layer 60 and the virtualization layer 62 may include edge components, such as a web server front end and image cache, as well as an image library store, e.g., in a high-performance RAID storage area network (SAN).

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. In one exemplary embodiment, logic 70 in the management layer 64 implements the exemplary network computing management processes described herein; however, it will be understood that the logic 70 may be implemented in any layer.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a mobile desktop for mobile devices (e.g., 54A, 54C, and 54N, as well as mobile nodes 10 in cloud computing environment 50) accessing the cloud computing services.

The logic 70 includes one or more algorithms to implement embodiments described herein to provide network computing management services. In an embodiment, the logic 70 is coupled to and/or resides in the memory 28 shown in FIG. 1. In addition, embodiments of the logic 70 include one or more program modules 42 of the program/utility 40 shown in FIG. 1. In a further embodiment, the logic 70 is part of the management layer 64 and is executed on hardware located in the hardware and software layer 60.

The exemplary network computing management services may be implemented by a computer device (e.g., computer system 12) configured to identify locations (either current or future) of users who have instances configured at a data center, consult a dynamic list of data centers and metadata, and to relocate these instances based on the users' current or future locations. In one exemplary embodiment, the logic 70 executes on the computer device and autonomously determines the users' current or future locations. In an alternative exemplary embodiment, the logic 70 receives this location information directly from the users. The dynamic data center list utilized by the logic 70 in its evaluations includes the locations of the data centers, as well as their capabilities and configuration details, as well as their current availabilities, which are collectively referred to as metadata. These and other aspects of the network computing management services will now be described with respect to FIGS. 4-6.

Figure 4:
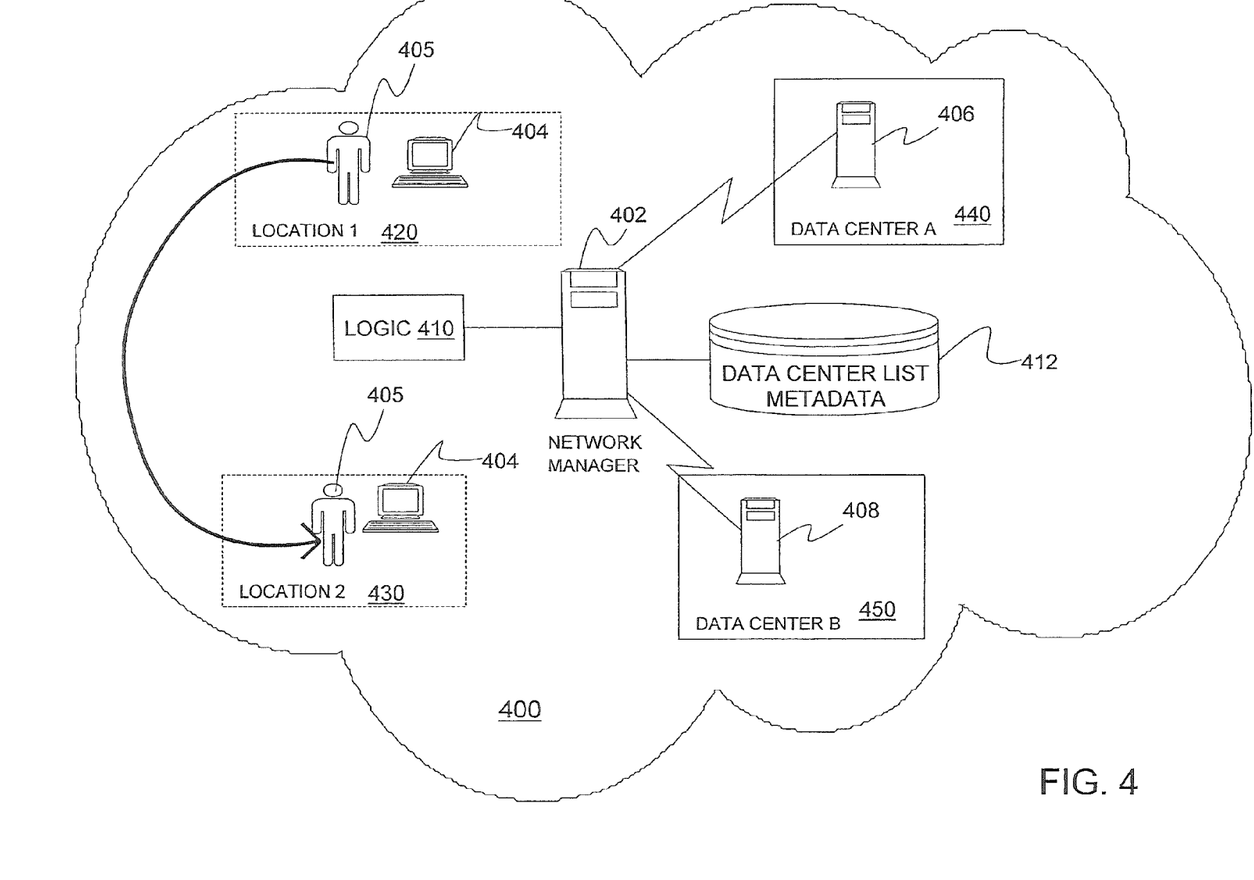
FIG. 4 depicts a block diagram of a system upon which network computing management may be implemented according to an embodiment of the present invention.

Turning now to FIG. 4, a system upon which the network computing management services may be implemented will now be described. The system of FIG. 4 depicts a network 400 including a network manager 402 and data centers 440 and 450, which are communicatively coupled to the network manager 402. The network 400 may be a cloud computing network (e.g., the network 50 of FIG. 2) that offers virtual computing services to end users.

The network manager 402 may be implemented as one or more high-speed computer processing devices, such as one or more mainframe computers capable of handling a high volume of computing activities conducted by end users of the cloud computing network. The network manager 402 executes logic 410 for implementing the network computing management services. The logic 410 refers to the logic 70 described above in FIG. 3. The network manager 402 is communicatively coupled to a storage device 412 that stores, e.g., dynamic data center lists and related metadata.

As shown in FIG. 4 for illustrative purposes, two data centers 440 and 450 (referred to as data center A and data center B, respectively) are provided, each of which includes a respective server 406 and server 408. It will be understood that each data center may contain multiple servers, as well as a plurality of other resources typically found in a cloud computing environment. For example, each of the data centers may include dozens of processors, applications, storage, etc.

The network 400 also includes a communication device 404 communicatively coupled to the network manager 402. The communication device 404 may be any type of computer device, such as a general-purpose desktop, or may be a portable communication device, such as a laptop or portable hand held computer device (e.g., a smart phone). The communication device 404 may be equipped with global positioning system (GPS) components or other components that facilitates identification of a location in which the communication device 404 resides. The communication device 404 is operated by a user 405 of the cloud computing environment. While only a single communication device 404 is shown in FIG. 4 for ease of description, it will be understood that any number of communication devices may be used in realizing the advantages of the exemplary network computing management services described herein.

As shown in FIG. 4, the user is situated in a location 420. The location 420 (also referred to as location 1) refers to a geographic area at which the user resides at a first time period (T1). In an embodiment, the user may have created a virtual computer instance with a particular data center via, e.g., the communication device 404. In this embodiment, the data center through which the instance is created may be the geographically closest data center (e.g., data center 440) to the user's location (i.e., location 420). In an exemplary embodiment, a second location 430 (referred to herein as location 2) represents a physical area to which the user has relocated (e.g., at a second time period (T2)) or, alternatively, to which the user plans to relocate at some defined future time (e.g., at a second time period (T2)).

Figure 5:
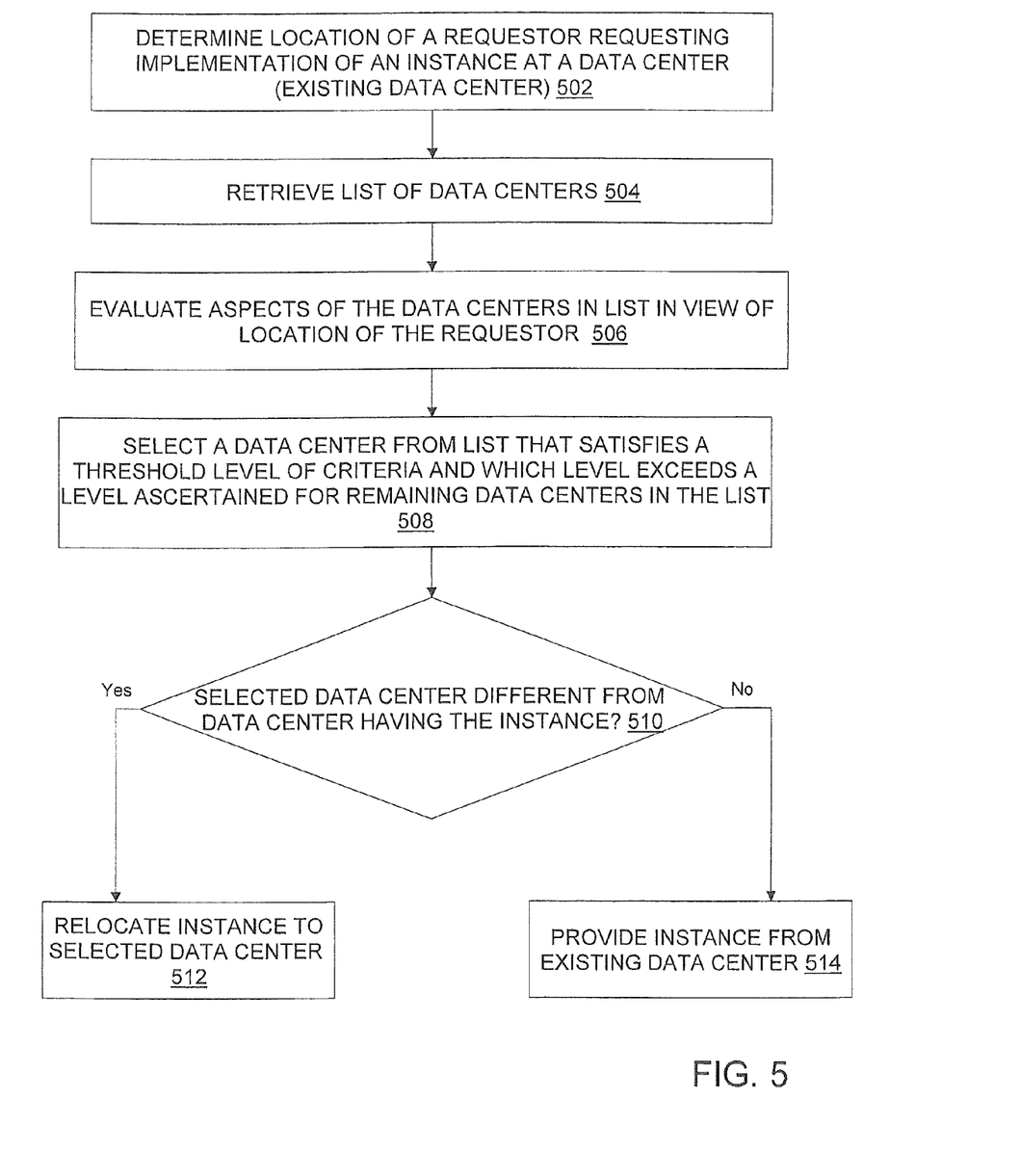
FIG. 5 depicts a flow diagram of a process for providing network computing management according to an embodiment of the present invention.

As described above, the exemplary network computing management processes evaluate dynamic data center lists and metadata with respect to the user 405 in determining when and where to relocate an instance associated with the user 405. Turning now to FIG. 5, a process for implementing the network computing management services will now be described in an exemplary embodiment. The processes described in FIG. 5 assume that the user 405 is currently situated at (i.e., has relocated to) the second location 430 when initiating an instance that has been configured via data center 440.

At step 502, the logic 410 determines a location of a requestor (e.g., "user") who is requesting implementation (or will request implementation) of an instance configured at a data center (e.g., data center 440). The location may be a current location or a planned future location of the user. The determination may be made using a variety of techniques. For example, if the determination is for a current location of the user, the determination may be made autonomously by the logic 410, e.g., using global positioning system (GPS) location data of a communication device, triangulation techniques, hypertext markup language (e.g., HTML5 geo location) techniques, a current Internet Protocol (IP) address of the communication device 404, a scheduled event (e.g., an appointment or event scheduled into the communication device's 404 calendar, application, or stored in a database and which provides a particular date that indicates the scheduled location of the user for the particular date and is retrievable via GPS-enabled components on the communication device). If the determination is for a future location of the communication device 404, the determination may be made in a similar manner as described above for the current location. In an alternative embodiment, the determination of the location may be made by direct input of the user specifying a location.

Figure 6:
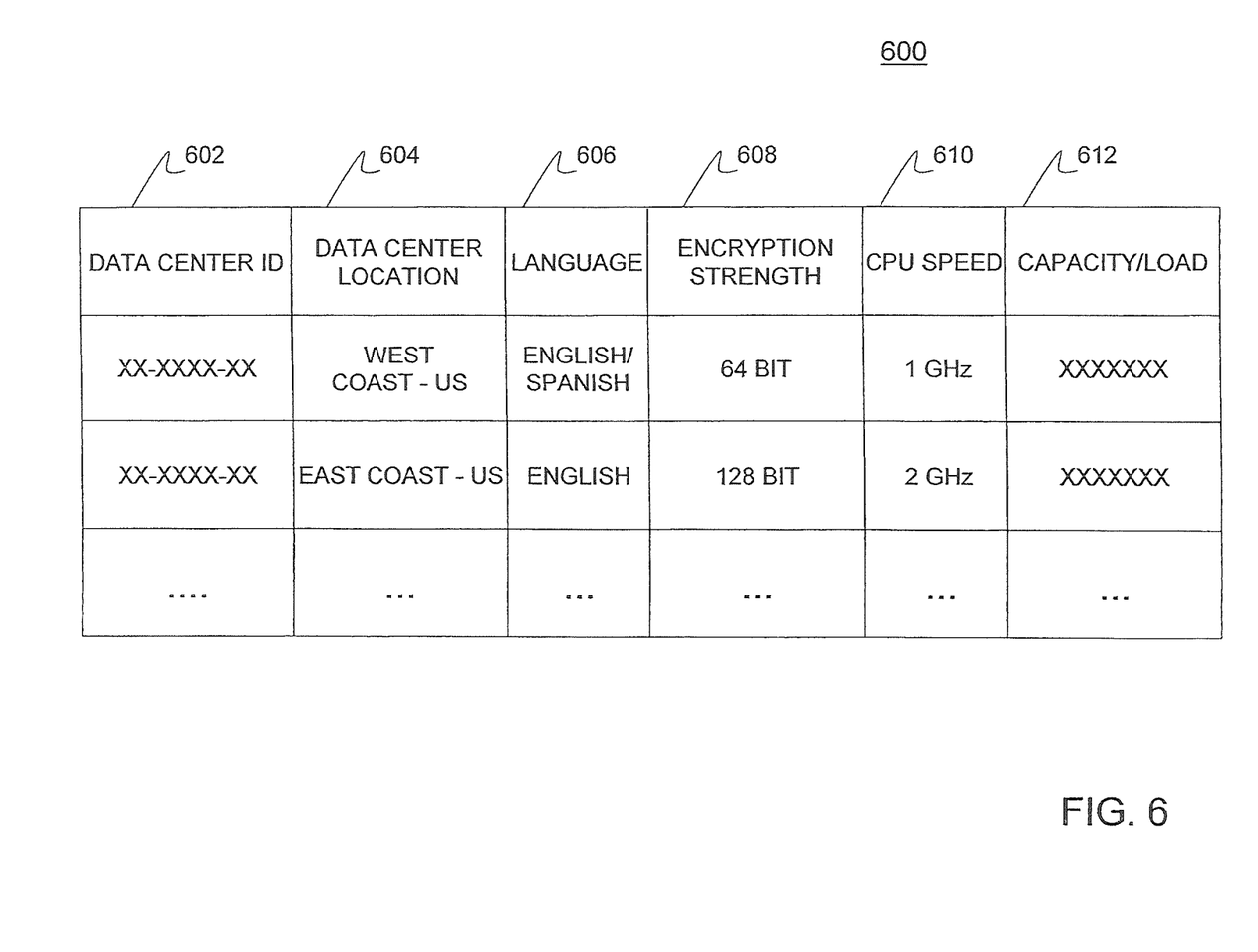
FIG. 6 depicts a dynamic data center list used in implementing network computing management according to an embodiment of the present invention.

At step 504, the logic 410 retrieves a list of data centers, e.g., stored in the storage device 412. A table 600 of data centers with sample data is shown in FIG. 6. A shown in the table 600, data center records 602 include aspects that identify various characteristics, such as data center locations 604, language 606, encryption strength 608, CPU speed 610, and capacity/load 612. It will be understood that the aspects illustrated in FIG. 6 are not exhaustive and that any type and number of aspects may be included in the table 600, e.g., local laws or regulations, price information, etc. The table 600 reflects a dynamic list of data centers in that availability evaluations conducted by the logic 410 may consider the current capacity or load of a respective data center at a given point in time via the capacity/load field 612. The preferability or desirability of a particular data center may change from one determination to another based on the current capacity or load status of the data center; thus, the list of data centers is 'dynamic.'

At step 506, the logic 410 evaluates the list of data centers in view of the location determined in step 502. For example, the logic 410 considers which data center is closest in location to the user 405. The logic 410 also evaluates the aspects of the data centers, e.g., as shown in FIG. 6.

At step 508, the logic 410 selects a data center from the list that satisfies a threshold level of criteria and which exceeds a level of the criteria ascertained for all of the remaining data centers in the list. For example, the closest determined data center may not be selected if the availability of that data center is restricted due to a high volume of activity. In another example, a third closest data center may be selected if the collective evaluated criteria reflect that the third closes data center will provide the highest level of encryption strength, computer processing unit (CPU) speed, and storage space as compared to all other data centers in the list. Any combination of criteria may be used in the evaluation process. The examples above provide a non-limiting illustration of such criteria combinations.

At step 510, it is determined whether the selected data center from step 508 is different than the data center in which the instance has been initially configured. If so, the logic 410 communicates a request to the originating data center 440 to relocate the instance to the selected data center at step 512. The relocation process may be implemented as a function of the location determination described above. For example, if the location determination refers to a future planned location of the user, the relocation process may be configured to be initiated at a specified amount of time in advance of the user's anticipated arrival at the new location or on the scheduled date reflected in the calendar application. Otherwise, if the location determination refers to a current location of the user (i.e., the user has already relocated to a new location), the relocation process may be instantaneously (e.g., contemporaneously) implemented. In one embodiment, the location may be reset after conclusion of a scheduled event (e.g., to some default location of the user).

At step 514, if the selected data center is the same as the originating data center, the logic 410 is configured to provide the instance as requested to the user from the originating data center (i.e., without relocation).

In an embodiment, the network computing management services may be configured to provide additional cloud resources that are related to the instance accessed by a user, e.g., storage, IP addresses, etc. When the instance is relocated to a different location, these related resources may be relocated along with the instance.

Technical effects include evaluating dynamic data center lists and metadata in determining when and where to relocate an instance associated with a network user. A current or future location of the user is determined and utilized in the evaluation, in conjunction with aspects of the data centers in the dynamic data center list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A method for implementing network computing management, comprising:
    determining a future location of a requestor having current access to an instance configured at a data center, the future location is a geographic location that is different than a geographic location in which the requestor has the current access, the current access to the instance configured at the data center comprises an active virtual computer instance with the data center created by the requestor;
    determining a current location of the requestor from a scheduled event stored in a calendar application of the requestor;
    retrieving a list of data centers configured for a network computing environment;
    evaluating aspects of the data centers in the list in view of the future location of the requestor, the aspects evaluated including encryption strength of each of the data centers in the list;
    selecting a data center from the list that satisfies a threshold level of criteria and which threshold level exceeds a level ascertained for remaining data centers in the list; and
    in response to determining the data center selected is different from the data center through which the instance is configured, relocating the instance to the selected data center;
    wherein relocation of the instance is configured to be initiated at a specified amount of time in advance of the requestor's anticipated arrival at the new location, the specified amount of time determined as a function of the current location and the future location.

2. The method of claim 1, wherein a current location of the requestor is determined by at least one of:
    global positioning system data from a communication device;
    a triangulation technique;
    hypertext markup language;
    a current Internet Protocol address of a communication device associated with the requestor; and
    direct input by the requestor via a communication device.

3. The method of claim 1, wherein the relocating is performed contemporaneously with the determining the data center selected is different from the data center through which the instance is configured.

4. The method of claim 1, wherein the future location is determined by a scheduled event stored in a global positioning system-enabled device.

5. The method of claim 1, wherein the relocating is performed at a scheduled date.

6. The method of claim 1, wherein the aspects of the data centers evaluated include location of the data centers and at least one of:
  price;
  central processing unit speed; and
  current load.

7. The method of claim 1, wherein the future location is determined by a scheduled event stored in a database.

8. The method of claim 1, wherein the future location is determined by a scheduled event stored in a calendar application.

9. The method of claim 1, wherein the aspects of the data centers evaluated include language.

10. The method of claim 1, wherein the aspects of the data centers evaluated include local laws.

11. The method of claim 1, wherein a designated future location of the requester is automatically reset to a default location after conclusion of the scheduled event.

12. A system for implementing network computing management, comprising:
  a computer processor; and
  logic executable by the computer processor, the logic configured to implement a method, the method including:
    determining a future location of a requestor having current access to an instance configured at a data center, the future location is a geographic location that is different than a geographic location in which the requestor has the current access, the current access to the instance configured at the data center comprises an active virtual computer instance with the data center created by the requestor;
    determining a current location of the requestor from a scheduled event stored in a calendar application of the requestor;
    retrieving a list of data centers configured for a network computing environment;
    evaluating aspects of the data centers in the list in view of the future location of the requestor, the aspects evaluated including encryption strength of each of the data centers in the list;
    selecting a data center from the list that satisfies a threshold level of criteria and which threshold level exceeds a level ascertained for remaining data centers in the list; and
    in response to determining the data center selected is different from the data center through which the instance is configured, relocating the instance to the selected data center;
    wherein relocation of the instance is configured to be initiated at a specified amount of time in advance of the requestor's anticipated arrival at the new location, the specified amount of time determined as a function of the current location and the future location.

13. The system of claim 12, wherein a current location of the requestor is determined by at least one of:
  global positioning system data from a communication device;
  a triangulation technique;
  hypertext markup language;
  a current Internet Protocol address of a communication device associated with the requestor;
  a scheduled event stored in a calendar application; and
  direct input by the requestor via a communication device.

14. The system of claim 12, wherein the relocating is performed contemporaneously with the determining the data center selected is different from the data center through which the instance is configured.

15. The system of claim 12, wherein the future location is determined by at least one of:
  a scheduled event stored in a global positioning system-enabled device;
  a scheduled event stored in a database;
  a scheduled event stored in a calendar application; and
  direct input by the requestor via a communication device.

16. The system of claim 12, wherein the relocating is performed at a scheduled date.

17. The system of claim 12, wherein the aspects of the data centers evaluated include location of the data centers and at least one of:
  language;
  local laws;
  price;
  central processing unit speed; and
  current load.

18. A computer program product for implementing network computing management, the computer program product comprising a non-transitory storage medium having computer-readable program code embodied thereon, which when executed by a computer processor, causes the computer processor to implement a method, the method comprising:
  determining a future location of a requestor having current access to an instance configured at a data center, the future location is a geographic location that is different than a geographic location in which the requestor has the current access, the current access to the instance configured at the data center comprises an active virtual computer instance with the data center created by the requestor;
  determining a current location of the requestor from a scheduled event stored in a calendar application of the requestor;
  retrieving a list of data centers configured for a network computing environment;
  evaluating aspects of the data centers in the list in view of the future location of the requestor, the aspects evaluated including encryption strength of each of the data centers in the list;
  selecting a data center from the list that satisfies a threshold level of criteria and which threshold level exceeds a level ascertained for remaining data centers in the list; and
  in response to determining the data center selected is different from the data center through which the instance is configured, relocating the instance to the selected data center;
  wherein relocation of the instance is configured to be initiated at a specified amount of time in advance of the requestor's anticipated arrival at the new location, the specified amount of time determined as a function of the current location and the future location.

19. The computer program product of claim 18, wherein a current location of the requestor is determined by at least one of:
  global positioning system data from a communication device;
  a triangulation technique;
  hypertext markup language;
  a current Internet Protocol address of a communication device associated with the requestor;
  a scheduled event stored in a calendar application; and
  direct input by the requestor via a communication device.

20. The computer program product of claim 18, wherein the relocating is performed contemporaneously with the determining the data center selected is different from the data center through which the instance is configured.

21. The computer program product of claim 18, wherein the future location is determined by at least one of:
- a scheduled event stored in a global positioning system-enabled device;
- a scheduled event stored in a database;
- a scheduled event stored in a calendar application; and
- direct input by the requestor via a communication device.

22. The computer program product of claim 18, wherein the relocating is performed at a scheduled date.

23. The computer program product of claim 18, wherein the aspects of the data centers evaluated include location of the data centers and at least one of:
- language;
- local laws;
- price;
- central processing unit speed; and
- current load.

* * * * *